United States Patent
Dewailly

(10) Patent No.: US 12,480,834 B2
(45) Date of Patent: Nov. 25, 2025

(54) SYSTEM FOR DETECTING LEAKS AND ASSOCIATED METHOD

(71) Applicant: ATEQ, Les Clayes-sous-Bois (FR)

(72) Inventor: Guy Dewailly, White Bluff, TN (US)

(73) Assignee: ATEQ, Les Clayes-sous-Bois (FR)

( * ) Notice: Subject to any disclaimer, the term of this patent is extended or adjusted under 35 U.S.C. 154(b) by 263 days.

(21) Appl. No.: 17/770,578

(22) PCT Filed: Oct. 20, 2020

(86) PCT No.: PCT/EP2020/079527
§ 371 (c)(1),
(2) Date: Apr. 20, 2022

(87) PCT Pub. No.: WO2021/078756
PCT Pub. Date: Apr. 29, 2021

(65) Prior Publication Data
US 2022/0364948 A1     Nov. 17, 2022

(30) Foreign Application Priority Data

Oct. 22, 2019   (FR) ...................................... 1911821

(51) Int. Cl.
*G01M 3/32*     (2006.01)
*G01M 3/28*     (2006.01)

(52) U.S. Cl.
CPC ........ *G01M 3/3263* (2013.01); *G01M 3/2815* (2013.01)

(58) Field of Classification Search
CPC ............. G01M 3/3263; G01M 3/2815; G01M 3/3209; G01M 3/329; G01M 3/26
See application file for complete search history.

(56) References Cited

U.S. PATENT DOCUMENTS

| 5,495,748 A | 3/1996 | Brede et al. |
| 5,495,750 A * | 3/1996 | Dufresne ............ G01M 3/2853 73/49.1 |

(Continued)

FOREIGN PATENT DOCUMENTS

| CN | 103674433 A | 3/2014 |
| WO | WO-2020252882 A1 * | 12/2020 .......... G01M 3/3254 |

OTHER PUBLICATIONS

WO-2020252882-A1 (Year: 2020).*

(Continued)

*Primary Examiner* — Fatemeh Esfandiari Nia
(74) *Attorney, Agent, or Firm* — Dierker & Kavanaugh, P.C.

(57) ABSTRACT

The present invention relates to a system (20; 20') for detecting leaks for a part having a permeable zone, said system comprising:
 a test chamber (22, 22') configured to receive the part to be tested;
 a device (24) suitable for varying the pressure in the test chamber and/or in the part to be tested;
 a measuring device (26) for measuring a physical quantity representative of the leak level;
characterised in that said system (20; 20') comprises a main pipe (30) configured to cooperate with the permeable zone of said part, said main pipe (30) having one end (30*a*) which communicates with the permeable zone, while the other end (30*b*) of said pipe (30) opens outside the test chamber (22; 22').

7 Claims, 7 Drawing Sheets

(56) References Cited

U.S. PATENT DOCUMENTS

| | | | | |
|---|---|---|---|---|
| 6,599,144 B1* | 7/2003 | Schumann | ............ | G01M 3/26 |
| | | | | 439/219 |
| 2003/0019281 A1 | 1/2003 | Lehmann | | |
| 2004/0177676 A1 | 9/2004 | Moore | | |
| 2013/0031962 A1 | 2/2013 | Nandwani et al. | | |
| 2020/0205478 A1* | 7/2020 | Dick | ............ | A24F 40/65 |
| 2022/0304381 A1* | 9/2022 | Dubey | ............ | A24F 40/42 |

OTHER PUBLICATIONS

"Bullen" ( Steven Bullen, What is a Double Seal and When to Use One (Double Seals: Part 1), Chesterton Company, Jun. 6, 2017). (Year: 2017).*

* cited by examiner

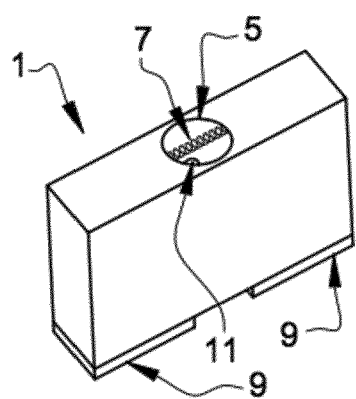

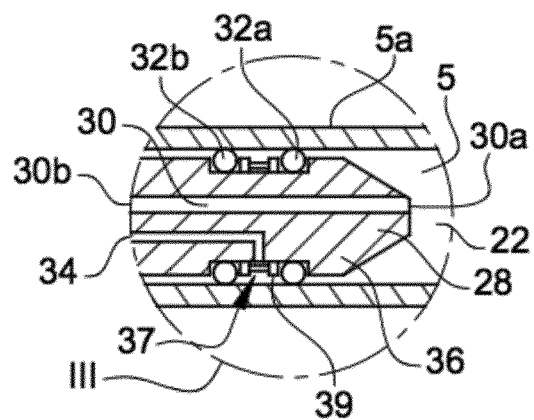

SYSTEM FOR DETECTING LEAKS AND ASSOCIATED METHOD

The present invention relates to the field of systems for detecting leaks or for measuring tightness, more particularly leak detection systems based on the measurement of a physical quantity, such as a pressure or a flow rate, relative to a leak level.

Indeed, it is necessary to be able to check the integrity of products and/or to check whether the latter have a leak and to be able to quantify it. The products/parts to be tested are for example electronic devices, mechanical parts, containers, etc.

Tightness is a critical characteristic in the context of products subject to difficult external constraints and required to meet particular operating requirements, such as that of being impermeable to liquids (such as water), not having leaks liable to degrade the performances of the product, etc.

More specifically, there is a specific type of products in which some sections must have a certain level of tightness (for example, remain tight at depths of 1 m) while other sections are not tight (especially when these products are not tested in a use/assembled position, but as such).

Two specific examples given here merely as indicative examples can thus be considered:
- electronic devices, such as smartphones, tablets, smart watches, etc., which must have a certain level of tightness to liquids (such as water), but which also include a permeable zone, such as an opening connecting the inside and the outside of the device, in order to keep the inside of the device at atmospheric pressure, said opening being generally sealed by a gas-permeable and liquid-tight membrane (for example, a Gore-Tex® membrane).
- liquid cartridges for electronic cigarettes (or e-cigarettes), a very schematic example of an electronic cigarette cartridge being represented in FIGS. 1a to 1c, respectively in perspective, sectional and front views, wherein it can be seen that the cartridge 1 comprises a tank 3 intended to store a liquid, a suction tube 5 passing through said cartridge 1 and being surrounded by said tank 3, as well as a wick 7 which is disposed across the suction tube 5 and the ends of which are located in said tank 3.

Moreover, the tank 3 is generally delimited by a wall and a sealing means 9, such as a rubber cap, closing the tank 3 after filling. It will be noted that the suction tube 5 of the cartridge 1 is made by bending a metal sheet, on which it is necessary to produce a solder joint 11 to finalise said tube 5, said solder joint being generally inside the suction tube 5 (along the wall delimiting the inside of said tube). Moreover, so that the ends of the wick 7 are in the tank 3, openings are arranged in the wall 5a of the suction tube 5 so that said wick 7 steeps in the liquid and the latter impregnates the wick 7.

An electronic cigarette cartridge must thus have satisfactory tightness at the elements delimiting the tank (such as the outer wall and the sealing means) while including a permeable zone at the suction tube (due to the openings through which the wick is inserted into the tank).

Thus, these parts, by their very design, have a permeable zone, enabling communication between the inside and the outside of the part. Said permeable zone can also be equated with a leak greater (or even much greater for example by an order of 100) than the leak that it is sought to determine in another zone of the part (in the examples above, the outer walls of said objects).

It will be noted that the term "permeable zone" denotes a zone which can at least be traversed by a liquid (such as water) and/or a gas (such as air).

For this type of product, the method usually used to test the tightness of part is the so-called "sealed component" method.

This method consists, firstly, of hermetically sealing the part to be tested, by example by sealing the end of the suction tube for the cartridge or the gas-permeable membrane for the electronic device.

Then, subsequently, the sealed part to be tested is disposed in a test chamber, the pressure is varied in a controlled manner in the test chamber (for example, by injecting a gas, such as air), and a pressure variation after a predetermined time is measured. Indeed, if the accessible volume is greater than the volume of the test chamber from which the volume of the part to be tested is subtracted, there is then a gas pressure variation which reflects the volume actually accessible to said gas (i.e. the volume of the test chamber and at least a portion of the internal volume of the part if it is not tight).

However, with this method, it is necessary to perform teach-in test cycles with a part in which the tightness is satisfactory to be able to subsequently discriminate tight parts from those having leaks and/or make a differential measurement (i.e. compare the pressure in two test chambers, one containing the part to be tested and the other a part considered to be "satisfactory").

This method thus has the drawback of requiring certain expertise from the operator in order to calibrate the leak detection system correctly and/or seal the parts to be tested correctly.

Moreover, this method can be difficult to implement when leak detection is performed on parts having small internal volumes, for minor leaks and/or parts in which the rigidity (or flexibility) skews the results (the deformation of the part caused by a pressure variation being capable of inducing errors on the leak measurement result).

Therefore, the need is observed to have a leak detection device and method making it possible to check the tightness of a part, while these parts have permeable zones due to the specific functions thereof.

The present invention is particularly advantageous in leak detection on parts having a permeable zone, said zone connecting at least one internal part of the part with the outside.

Thus, the present invention at least partially solves the above problems by proposing a novel type of leak detection system for parts having a permeable zone, said system comprising:
- a test chamber configured to receive the part to be tested;
- a device suitable for varying the pressure in the test chamber and/or in the part to be tested;
- a device for measuring a physical quantity representative of the leak level;

characterised in that said system comprises a main pipe configured to cooperate with the permeable zone of said part, said main pipe having one end which communicates with the permeable zone, while the other end of said pipe opens outside the test chamber.

The presence of a pipe communicating with the zone of the part having a permeable zone makes it possible to better isolate the part to be tested from the test chamber, rendering the tightness test simpler and more repeatable, particularly by avoiding the need to perform teach-in test cycles on parts considered to be tight (and therefore avoiding having to use the "sealed component" method).

According to a possible feature, said system comprises an insert, said main pipe being arranged in said insert.

It is advantageous for the main pipe to be arranged in a separate and removable part, the latter being easier to adapt according to the type of part to be tested.

According to another possible feature, the system comprises two seals ensuring the tightness between the outside and the inside of the part to be tested.

More specifically, said seals are disposed in such a way as to create the tightness at the section of the part whereby it is sought to test the tightness, for example via the permeable zone and the main pipe.

Thus, for an electronic device, such as a tablet, the main pipe is positioned to communicate with the opening comprising a gas-permeable membrane and said seals are positioned at the walls of the insert pressing against the part to be tested (it will also be noted that seals can be disposed at the wall of the chamber in which the insert passes through), while for an electronic cigarette cartridge, the insert is inserted into the suction tube and the seals positioned against the walls of the suction tube.

The benefit of having at least two seals is especially critical given that the contact zone with the seals can have an uneven surface, as is the case with electronic cigarette cartridges wherein the suction tube has a solder joint along said tube.

Indeed, without the presence of said seals, the leak measured could be a leak at the seal and not an inherent leak of the part to be tested.

It will also be noted that when it is sought to measure very small leaks with short test times, it is advantageous to minimise the variation of the volume in which the physical quantity representative of a leak is measured (volume variation for example due to displacement of the seal under the effect of a pressure differential between the two faces of the seal).

According to a possible feature, the system comprises a secondary pipe opening between the two seals. Said secondary pipe is for example arranged in said insert.

The presence of a secondary pipe makes it possible to vary the pressure established between the two seals, in order to limit the displacement of the seal in contact with the test volume and/or test a leak level at said seal. It will be noted that the gap between the two seals is also referred to hereinafter as the term "inter-seal volume".

According to another possible feature, the device suitable for varying the pressure in the test chamber is configured to vary the pressure according to a pressure gradient (i.e. according to variation of the pressure per unit of time).

Indeed, the leaks to be detected and to be measured can be associated with elements having non-linear behaviours, i.e. a part may not have a leak at a given pressure and have a leak for another pressure. It is thus advantageous to vary the test pressure over a given pressure interval to optimise possible leak detection (for example, a variation of 5 bar in 10 seconds). The pressure variation, particularly in the test chamber, is preferably linear and continuous, but this can also be a succession of plateau pressures.

According to another possible feature, the part to be tested is an electronic device having an opening sealed by a membrane permeable to gases (such as air) and tight to liquids (such as water).

According to another possible feature, the part to be tested is an electronic cigarette liquid cartridge including a liquid tank, a suction tube and a wick disposed across said tube and at least one of the ends of which is located in said tank.

According to another possible feature, said measuring device comprises a differential pressure sensor. Said differential sensor particularly makes it possible to make tightness measurements by comprising a part to be tested to a reference part, this helps partially avoid parasitic effects due to the environment wherein the test is performed.

According to another possible feature, the leak detection is performed via the main pipe.

It is advantageous to use the main pipe for the measurement of a physical quantity relating to a leak, as this simplifies the assembly and avoids providing another measurement point in the test chamber.

Moreover, the system according to the invention being intended to detect very low leak levels in the presence of the intrinsic leak (at the permeable zone) of the part to be tested, it is not a problem to obtain a measurable leak level confined by the leak level of the permeable zone.

The present invention also relates to a novel leak detection method for a device as described above, wherein the first seal isolates the inside the part to be tested from the inter-seal volume, the second seal isolating the inter-seal volume from the outside of the part to be tested, characterised in that it comprises the following steps:
establishing a similar first pressure in the test chamber and the inter-seal volume;
determining a first leak level;
establishing, in the inter-seal volume, a second pressure similar to the pressure of the main pipe of the insert;
determining a second leak level;
determining a leak level of the part based on the first and second leak levels.

According to a possible feature, said method includes a step of determining a leak correction factor (for example, associated with the first seal).

The leak correction factor serves to correct the value of the first leak level.

According to another possible feature, if the correction factor is less than a predetermined value, then the measurement of the first leak level is declared valid.

According to another possible feature, if the correction factor is greater than a predetermined value, then an alert is triggered.

According to another possible feature, the first and/or the second leak level are determined based on at least one pressure interval, such as a pressure gradient.

The invention will be understood better, and other aims, details, features and advantages thereof will emerge more clearly in the course of the following description of specific embodiments of the invention, given merely by way of illustration and not limitation, with reference to the appended drawings, wherein:

FIG. 1a is a very schematic representation of an electronic cigarette liquid cartridge;

FIG. 3 is an enlarged view of a subsection of the system in FIG. 2;

FIG. 4b is an enlarged very schematic view of a section of the system in FIG. 4a.

Figure 1B:
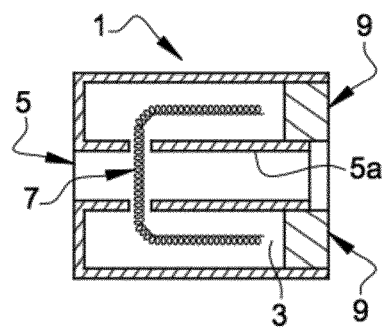
FIG. 1b is a very schematic representation of an electronic cigarette liquid cartridge.
Figure 1C:
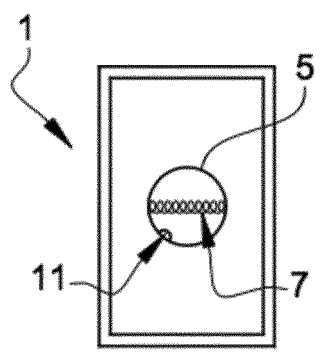
FIG. 1c is a very schematic representation of an electronic cigarette liquid cartridge.
Figure 2:
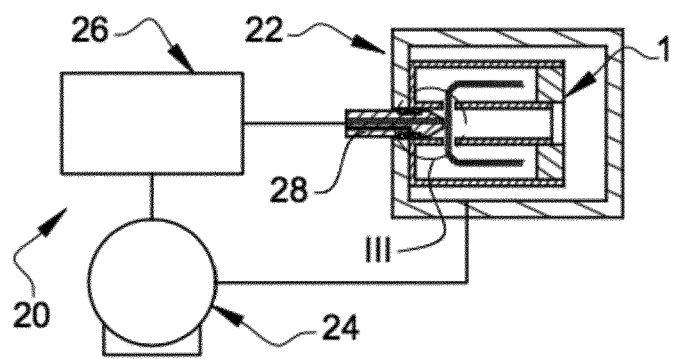
FIG. 2 is a very schematic representation of the detection system according to the invention in a first application example.

FIG. 2 is a very schematic representation of a detection system 20 according to the invention in a first application example, wherein said leak detection system 20 is used on a cartridge 1 as described with reference to FIGS. 1a to 1c.

Said system 20 thus comprises:
- a test chamber 22 configured to receive the part to be tested, here said cartridge 1 (represented very schematically);
- a device 24 suitable for varying the pressure in the test chamber 22;
- a measuring device 26 for measuring a physical quantity representative of the leak level, such as a pressure gauge or a flow meter;
- an insert 28 (or connection part) configured to cooperate with the zone of the cartridge 1 including a permeable zone.

The insert 28 is therefore inserted into the suction tube 5 of the cartridge 1 via one of the ends of said tube, while the other end of the tube is sealed by a sealing means, such as a cap.

As more specifically illustrated in FIG. 2, said insert 28 thus includes at least one main pipe 30 one end 30a of which communicates with the permeable zone of the part, while the other end 30b opens outside the test chamber 22. More specifically, the main pipe 30 opens into the suction tube 5 of the cartridge preferably in the vicinity of the wick 7 of the cartridge 1, and therefore openings arranged in the wall 5a delimiting said tube 5 and communicating with the tank 3 (therefore at the zone of the part which is permeable).

Said insert 28 also includes:
- at least two seals 32a and 32b, referred to as first 32a and second 32b seals, configured to ensure the tightness between the outside and the permeable zone of said part 1,
- a secondary pipe 34 opening between the two seals;
- a main body 36 wherein the main 30 and secondary 34 pipes are arranged.

It will be noted that in the example represented in FIGS. 2 and 3, the insert 28 comprises two O-ring seals 32a and 32b which are mounted on the outer periphery of said insert 28 and disposed in contact with the wall 5a of the tube 5, but depending on the structure of the part to be tested, said seals 32a, 32b can be disposed differently. The space defined by said seals 32a and 32b, the wall 5a of the suction tube 5 and the main body 36 of the insert 28 defines a volume 37, referred to as inter-seal volume (said secondary channel 34 thus opens into the inter-seal volume 37).

The first seal 32a of the insert 28 isolates the inside of the cartridge to be tested from the inter-seal volume 37, while the second seal 32b isolates the inter-seal volume 37 from the outside.

It will be noted, moreover, that the presence of two seals ensures a certain tightness level, in spite of a poor surface condition of the wall 5a of said tube 5 (particularly due to the solder joint 11).

The insert 28 can also comprise a device 39 for holding the seals configured to hold the seals 32a and 32b in position and maintain a predetermined distance therebetween.

Furthermore, when it is sought to test the tightness level of a cartridge 1, a leak detection method comprising the following steps is applied:

Establishing a similar first pressure $P_1$ in the test chamber 22 and the inter-seal volume 37, while the pressure in the suction tube 5 is for example kept at atmospheric pressure (this can be performed simply by means of the main pipe 30 opening outside the test chamber 22 and a valve).

Determining a first leak level $F_1$, this determination is performed by measuring the variation of a physical quantity as a function of time, such as a pressure variation in the test chamber or at the suction tube 5 (for example, by means of the main pipe of the insert).

Establishing a second pressure $P_2$ in the inter-seal volume 37 and in the zone of the part to be tested having a controlled leak, here the inside of the suction tube 5 of the cartridge 1 (this also limits the displacement of the first seal 32); it will be noted that the second pressure $P_2$ is for example equal to atmospheric pressure.

Determining a second leak level $F_2$, as above, this determination is performed by measuring the variation of a physical quantity as a function of time, such as a pressure variation in the test chamber 22 or at the suction tube 5 by means of the insert 28.

Determining a leak level of the part $F_p$ based on the first $F_1$ and second $F_2$ leak levels previously determined.

Thus, the first leak level $F_1$ determine possibly includes the measurement of a leak associated with poor tightness at the seals 32a and 32b, particularly the first seal 32a, as well as other uncontrolled phenomena, seal displacements, temperature variation, etc.

While the second tightness level $F_2$ determined measures a leak which does not include the leak at the first seal 32a.

During the determination of the leak level, said method can also comprise a step of determining a leak correction factor serving to correct the value of the first leak level $F_1$ (for example, associated with a leak at the first seal).

According to the value of this correction factor, for example if the value of the first leak level is not modified by more than 5%, the measurement of the first leak level $F_1$ is declared valid and is therefore considered as representative of the tightness level of the part tested.

If the correction factor is greater than a predetermined value, an alert is triggered, indicating to the user that there is a problem in the leak detection carried out, for example that the seal(s) are damaged or poorly positioned and that they should be better disposed or replaced.

The present detection method can also comprise an additional step wherein the correction factor is used to calculate a corrected leak level $F_1'$ (said correction factor being applied to the first leak level $F_1$), thus enabling the operator/user to be informed if the part tested meets the requested tightness criteria.

It will be noted moreover that the present method can be carried out with a set of discrete pressure values or with pressure intervals (or pressure gradients).

Figure 4A:
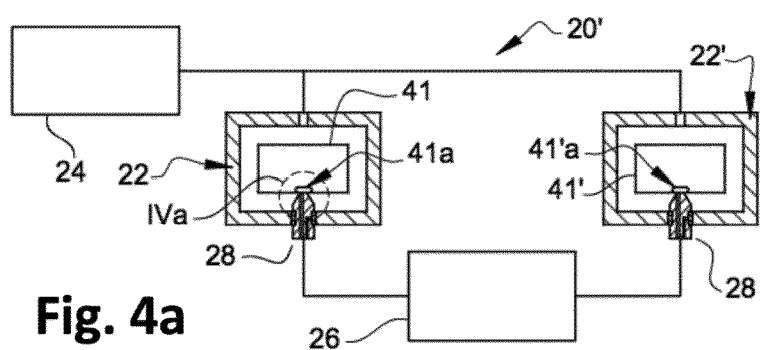
FIG. 4a is a very schematic representation of the detection system according to the invention in a second application example.

FIG. 4a, for its part, illustrates a leak detection system according to the invention in a second application example, wherein the leak detection system 20' is used on an electronic device 41, 41' having a permeable zone, such as an opening 41a, 41a' sealed by a gas-permeable and liquid-tight membrane (for example, a GoreTex® membrane which is permeable to air and water-tight).

It will be noted that the same references have been used to designate similar elements.

Said system 20' thus comprises:
- first 22 and second test chambers 22' configured to receive respectively a part to be tested 41 and a reference part 41', here electronic devices;
- a device 24 suitable for varying the pressure in the test chamber 22, 22';
- a measuring device 26 for measuring a physical quantity representative of the leak level (such as a pressure gauge or a flow meter);

inserts 28 cooperating respectively with each of the zones of the electronic devices respectively including a permeable zone, here the opening 41a, 41a' sealed by a membrane.

As above, each of said inserts 28 has a main pipe, one end of which communicates with the permeable zone 41a, 41a' of the part 41, 41', while the other end opens outside the test chamber 22, 22'.

Figure 4B:
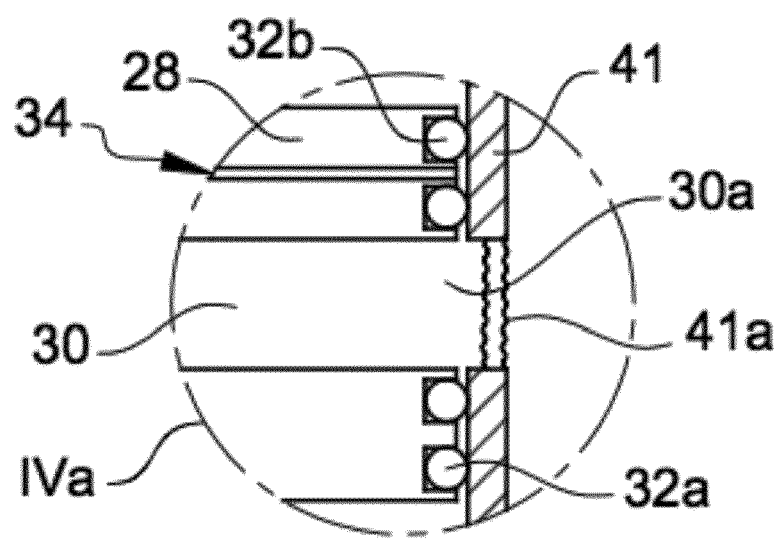

It will thus be noted that each of said inserts 28 has substantially the same structure as that described above with reference to FIGS. 2 and 3, except that when said insert 28 has two seals 32a and 32b, said seals 32a and 32b are disposed at the walls of the test chambers 22 and 22' and/or between the walls of the insert 28 and the wall surrounding the permeable zone 41a, 41a' of the part 41, 41'. The latter configuration is more specifically illustrated in FIG. 4b which is a very schematic and enlarged view of the contact zone between the main pipe 30 of the insert 28 and the permeable zone 41a.

The device 26 for measuring a physical quantity representative of the leak level comprises a differential pressure sensor and is connected to each of the inserts 28, more specifically by means of the main pipes 30 of the inserts 28.

The leak detection which is performed on the part to be tested can thus be performed in the same way as the method described above.

However, the leak detection method is advantageously performed by comparing the progression of a physical quantity representative of the leak level (such a pressure or a flow rate) between a part to be tested 41' and a reference part 41, making it possible to avoid environment-related variations.

Nevertheless, in an alternative embodiment not shown, leak detection on an electronic device can be performed without a reference part as within the scope of the first application described above.

Advantageously, the first pressure $P_1$ and/or the second pressure $P_2$ can be pressure intervals and more specifically pressure gradients (i.e. a pressure variation per unit of time), preferably continuous and linear. This variation of the pressure over time can also be a succession of plateau pressures.

The invention claimed is:

1. A leak detection method for a part having a permeable zone, wherein the method uses a system comprising:
   a test chamber configured to receive the part to be tested;
   a device suitable for varying a pressure in the test chamber and/or in the part to be tested;
   a measuring device for measuring a physical quantity representative of a leak level;
   a main pipe configured to cooperate with the permeable zone of said part, said main pipe having one end which communicates with the permeable zone, while an other end of said main pipe opens outside the test chamber;
   a first seal and a second seal ensuring tightness between the outside and the inside of the part to be tested and defining an inter-seal volume between the first seal and the second seal, the first seal isolating the inside of the part to be tested from the inter-seal volume, and the second seal isolating the inter-seal volume from the outside of the part to be tested;
   a secondary pipe opening in said inter-seal volume, and
   an insert configured to cooperate with the permeable zone of said part having the permeable zone, said insert comprising a main body wherein said main pipe and said secondary pipe are arranged in said insert, and said first seal and said second seal are mounted on said insert, wherein said measuring device uses a first pressure established in said test chamber via said main pipe and a second pressure established in said inter-seal volume via said secondary pipe, for detecting the leak in the part to be tested;
   wherein the method comprises:
   establishing at least the first pressure in the test chamber and the inter-seal volume respectively via the main pipe of the insert and via the secondary pipe of the insert;
   determining a first leak level;
   establishing, in the inter-seal volume, the second pressure via the secondary pipe of the insert;
   determining a second leak level; and
   determining the leak level of the part based on the first and second leak levels.

2. The method according to claim 1, further comprising determining a leak correction factor.

3. The method according to claim 1, wherein the first leak level and/or the second leak level are determined based on at least one pressure interval.

4. The method according to claim 1, wherein the device suitable for varying the pressure in the test chamber and/or in the part to be tested is configured to vary the pressure according to a pressure gradient.

5. The method according to claim 1, wherein the part to be tested is an electronic device having an opening sealed by a gas-permeable and liquid-tight membrane.

6. The method according to claim 1, wherein the part to be tested is an electronic cigarette liquid cartridge including a liquid tank, a suction tube and a wick disposed across said suction tube and at least one end of said wick is located in said liquid tank.

7. The method according to claim 1, wherein the measuring device comprises a differential pressure sensor.

* * * * *